Patented Dec. 9, 1952

2,621,210

UNITED STATES PATENT OFFICE 2,621,210

HEXAHYDROPHENANTHRENE CARBOXYLIC ACIDS

Karl Miescher, Riehen, Jules Heer, Jean-René Billeter and Georg Anner, Basel, Switzerland, assignors to Ciba Pharmaceutical Products, Inc., Summit, N. J.

No Drawing. Application July 21, 1947, Serial No. 762,526. In Switzerland January 10, 1944

4 Claims. (Cl. 260—520)

This application is a continuation-in-part of our copending application Serial No. 730,570, filed February 24, 1947, which itself is a continuation-in-part of our copending application Serial No. 542,812, filed June 29, 1944.

This invention is concerned with the manufacture of hexahydrophenanthrene-2-carboxylic acids which contain in the 7-position a phenolic hydroxyl group and in the 1- and 2-positions a hydrocarbon radical, for example, 7-hydroxy-1:2-dialkyl-hexahydrophenanthrene - 2 - carboxylic acids, and derivatives of such acids, especially esters and ethers thereof. The compounds of this new group exhibit a high oestrogenic action on rats when administered parenterally or per os.

The new hexahydrophenanthrene-2-carboxylic acids and derivatives thereof are made by reacting a 1-keto-hexahydrophenanthrene which contains in the 2-position in addition to a hydrocarbonradical a functionally converted carboxyl group and in the 7-position a free phenolic hydroxyl group or a substituent convertible into a free phenolic hydroxyl group, with an organo-metallic compound the metal atom of which being attached to a carbon atom with at least two hydrogen atoms in order to introduce a hydrocarbon radical into the 1-position, decomposing the resultant product, isolating the formed dehydration product and, if desired, converting the functionally converted carboxyl group in the 2-position and/or the substituent in the 7-position into a free carboxyl group or hydroxyl group, respectively, and hydrogenating non-aromatic multiple carbon-to-carbon bonds at any desired stage of the process after the reaction with the organo-metallic compound.

The hexahydrophenanthrenes used as starting materials contain in the 1-position a keto group and in the 2-position a hydrocarbon radical, for example an alkyl radical such as a methyl, ethyl, or propyl radical, or an alkenyl radical such as an allyl radical, and also a functionally converted carboxyl group, for example, a carbomethoxy, carbethoxy or carbobenzyloxy group. They also contain in the 7-position a free phenolic hydroxyl group or a substituent convertible into such a group. The latter may, for example, be a hydroxyl group etherified by means of methanol, ethanol, a phenol, a benzyl alcohol or the like, or a hydroxyl group esterified by means of an organic or inorganic acid, a nitro or amino group or a halogen atom.

In order to introduce hydrocarbon radicals into the 1-position, for example, an alkyl radical such as methyl, ethyl or propyl, an alkenyl radical such as allyl, an aralkyl radical such as benzyl, the starting material is reacted in the first reaction with the corresponding organo-metallic compound, for example, with an organo-magnesium halide or organo-zinc halide or the like, the resultant product is decomposed, the formed dehydration product is isolated, and the double bond formed by dehydration is saturated with hydrogen. The extent of dehydration depends on the kind of organo-metallic compound used for the reaction. A great amount of dehydration product is obtained for example, if an organo-magnesium iodide is used.

The conversion of the functionally converted carboxyl group in the 2-position and/or of the substituent in the 7-position into a free carboxyl or hydroxyl group respectively, is brought about, especially in the case of esters or ethers, by means of hydrolysing agents. However, in the case of benzyl ethers, there may be used, for example, reducing agents. An amino group in the 7-position is converted into a hydroxyl group by diazotisation and boiling. When both of the said substituents in the 2- and 7-positions are to be converted into a free carboxyl and hydroxyl group, respectively, this may be brought about in stages and in either order of succession.

In order to saturate non-aromatic multiple carbon-to-carbon bonds, especially double bonds formed by dehydration during the reaction with the organo-metallic compound or by reaction with unsaturated organo-metallic compounds, hydrogenation may be brought about at any desired stage of the process after the reaction with the organo-metal compound. For this purpose there may be used, for example, chemical methods such as catalytic or electrolytic hydrogenation with nascent hydrogen, or biochemical methods.

When the resulting compounds contain free carboxyl groups they may be esterified, for example, directly by means of diazo-methane or diazo-ethane or indirectly by way of the acid chloride or an alkali salt of the carboxylic acid in question. Finally, free phenolic hydroxyl groups may be esterified or etherified in known manner. In this connection there may be mentioned esters with organic acids, especially aliphatic or aromatic acids, for example, acetic acid, propionic acid, butyric acid, palmitic acid, stearic acid or benzoic acid, or with sulphonic acids, polycarboxylic acids or carboxy-sulphonic acids, and finally with inorganic acids such as sulphuric acid or phosphoric acid or carbonic acid or derivatives of these acids. Among the ethers there are to be mentioned more especially, for example, the alkyl ethers such as the methyl, ethyl or propyl ethers, and the glucosides.

The free carboxylic acids may be converted into the carboxylic acid salts, for example, alkali metal salts, alkaline earth metal salts or ammonium salts. When the ester or ether residue in the 7-position contains basic groups, the corresponding salts with inorganic acids, for example also the betaine ester salts may be made. The aforesaid salts find application, more especially in aqueous solution or for depotherapy.

The products of the invention find application as medicaments or as intermediate products for the manufacture of medicaments.

The following examples illustrate the invention, the parts being by weight unless otherwise stated, and the relationship of parts by weight to parts by volume being the same as that of the gram to the cubic centimetre:

*Example 1*

8.9 parts of 7 - methoxy - 1 - oxo-2-methyl-1:2:3:4:9:10 - hexahydrophenanthrene - 2 - carboxylic acid methyl ester melting at 95–96° C. and having the formula

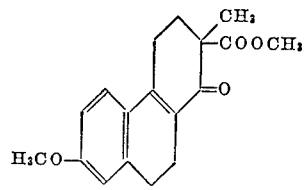

are dissolved in 135 parts by volume of benzene, and run at 0° C. with agitation into a Grignard solution obtained from 1.08 parts of magnesium, 6.95 parts of ethyl iodide and 135 parts by volume of ether. The reaction mixture is then boiled for ½ hour in a reflux apparatus, cooled with ice, and decomposed with ice and sulfuric acid. The benzene-ether mixture, after being washed with water and dried, leaves behind after evaporation a yellow coloured thick oil. It crystallises partially upon treatment with methanol. After recrystallisation from the same solvent the 7 - methoxy-1-ethylidene-2-methyl-1:2:3:4:9:10-hexahydrophenanthrene-2-carboxylic methyl ester so obtained melts at 146–147° and has the formula

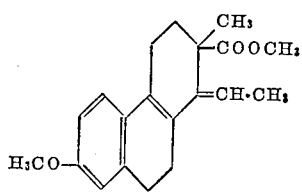

In order to hydrolyse the carbomethoxy group 2 parts of this product are heated in a mixture of 6 parts of potassium hydroxide and 20 parts by volume of ethanol of 95 per cent strength in an open vessel at 170–180° C. The resulting reaction mixture is diluted with water and extracted with ether. By mixing the aqueous alkaline solution so obtained with an excess of hydrochloric acid the unsaturated carboxylic acid is obtained. By crystallisation from acetone there is obtained from the latter product 7-methoxy-1-ethylidene-2-methyl - 1:2:3:4:9:10 - hexahydrophenanthrene-2-carboxylic acid of the formula

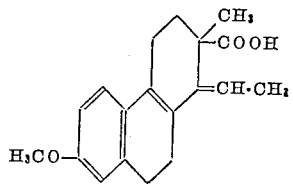

in the form of needles melting at 194–195° C. with decomposition.

4.8 parts of this unsaturated carboxylic acid are, for the purpose of hydrogenation of the double bond resulting from dehydration, dissolved in 450 parts by volume of water containing 4.8 parts of sodium hydroxide and hydrogenated in the presence of 6 parts of a nickel catalyst. When the absorption of hydrogen has ceased, the whole is filtered to remove the catalyst and the alkaline solution is acidified. The crystalline precipitate is dissolved in acetone, the solution is concentrated somewhat by evaporation, and allowed to crystallise. The resulting crystals consist of 7-methoxy-1-ethyl-2-methyl - 1:2:3:4:9:10 - hexahydrophenanthrene-2-carboxylic acid melting at 168–170° C. and having the formula

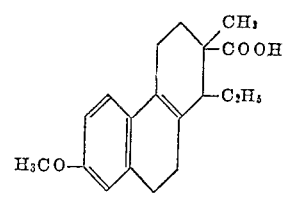

By evaporating the mother liquors from which the above acid is obtained and repeated recrystallisation of the residue from methanol, there is obtained the isomeric 7-methoxy-1-ethyl-2-methyl - 1:2:3:4:9:10 - hexahydrophenanthrene-2-carboxylic acid melting at 171–173° C.

1 part of the methoxy-acid melting at 168–170° C. is heated with 10 parts of pyridine hydrochloride for 3 hours at 170–180° C. in order to hydrolyse the methoxy group. Hydrochloric acid and ether are added to the cooled melt, and the mixture is agitated. The ethereal solution is then washed in turn with hydrochloric acid, a small quantity of a saturated solution of sodium bicarbonate and water, dried, and evaporated, and after recrystallising the residue from ethyl acetate there is obtained 7-hydroxy-1-ethyl-2-methyl - 1:2:3:4:9:10 - hexahydrophenanthrene - 2-carboxylic acid in the form of platelets melting at 184–186° C. and having the formula

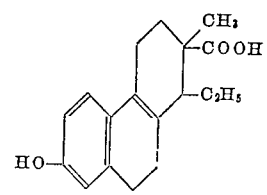

The methoxy-acid melting at 171–173° C., when treated in an analogous manner yields the isomeric 7 - methoxy-1 - ethyl - 2 - methyl-1:2:3:4:9:10 - hexahydrophenanthrene - 2 - carboxylic acid, which after recrystallisation from methanol melts at 189–193° C.

The hydrolysis of the methoxy group can also be carried out by heating 1 part of the methoxy-acid in a mixture of 5 parts of potassium hydroxide and 12 parts by volume of methanol for 5 hours in a sealed tube at 200° C., and isolating the hydroxy-acid in the usual manner.

*Example 2*

2.3 parts of pulverised 7-methoxy-1-oxo-2-methyl - 1:2:3:4:9:10-hexahydrophenanthrene-2-carboxylic acid melting at 168–179° C. described in Example 1 are suspended in 50 parts by volume of benzene, and 5 parts by volume of oxalyl chloride are introduced dropwise. After heating up for a short time the reaction becomes vigorous. The whole is allowed to stand overnight at room temperature, and then the solvent is evaporated under reduced pressure. The residue is obtained in the form of a pale yellow oil.

It is crude 7 - methoxy - 1 - ethyl - 2-methyl-1:2:3:4:9:10 - hexahydrophenanthrene - 2-carboxylic acid chloride of the formula

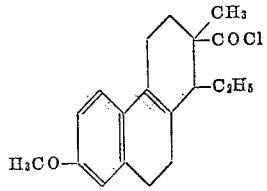

2 parts of this crude acid chloride are refluxed for ½ hour in an atmosphere of nitrogen with 10 parts by volume of methanol. The solution is evaporated to dryness and the residue crystallised from methanol whereby 7-methoxy-1-ethyl-2 - methyl - 1:2:3:4:9:10 - hexahydrophenanthrene-2-carboxylic acid methyl ester is obtained in the form of colourless needles melting at 75–77° C.

The above described acid chloride reacts in a similar manner, for example, with alcohols, amino alcohols, oxy-acids or phenols with the formation of the corresponding esters. The esterification of the carboxyl group may be carried out by heating a salt, for example, the sodium salt of the carboxylic acid, with an appropriate halogen compound.

Example 3

1 part of the 7-hydroxy-1-ethyl-2-methyl-1:2:3:4:9:10-hexahydrophenanthrene - 2 - carboxylic acid melting at 184–186° C. described in Example 1 is dissolved in 30 parts by volume of a 2N-aqueous solution of sodium hydroxide, and vigorously agitated after the addition of a small excess of dimethylsulphate. The precipitated oil is taken up in ether, the ethereal solution is agitated with sodium hydroxide solution and water, and after drying the solution, the solvent is evaporated. By recrystallising the residue from methanol 7-methoxy-1-ethyl-2-methyl-1:2:3:4:9:10-hexahydrophenanthrene - 2 - carboxylic acid methyl ester melting at 75–77° C. is obtained.

By using diethyl-sulfate instead of dimethylsulfate the corresponding 7-ethoxy derivative is obtained.

The etherification of the phenolic hydroxyl group can also be brought about by heating a salt thereof, for example, an alkali salt, with the appropriate halide.

Example 4

1 part of 7 - hydroxy - 1 - ethyl - 2-methyl-1:2:3:4:9:10-hexahydrophenanthrene - 2 - carboxylic acid melting at 184–186° C. is dissolved in 10 parts by volume of pyridine, and, after the addition of 10 parts by volume of acetic anhydride, the mixture is heated on the water bath for 5 hours. After cooling the whole is poured into water, extracted with ether, and the ethereal solution is washed in turn with hydrochloric acid, sodium bicarbonate solution and water, dried, and distilled. By recrystallising the residue from methanol 7 - acetoxy - 1-ethyl-2-methyl-1:2:3:4:9:10-hexahydrophenanthrene - 2 - carboxylic acid melting at 165–167° C. and having the formula

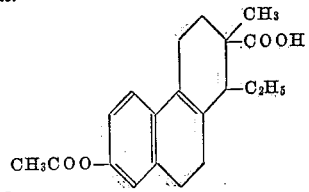

is obtained.

In a similar manner the 7-hydroxy-1-ethyl-2-methyl 1:2:3:4:9:10-hexahydrophenanthrene-2-carboxylic acid melting at 189–193° C. described in Example 1 can be acetylated in the 7-position.

For the production of higher esters in the 7-position the appropriate higher acid halides are advantageously used in the presence of an organic base, for example, pyridine.

Example 5

A solution of 4.88 parts of 7-methoxy-1-oxo-2 - methyl - 1:2:3:4:9:10 - hexahydrophenanthrene-2-carboxylic acid methyl ester in 75 parts by volume of benzene is run at 0° C., while thoroughly stirring, into a Grignard solution prepared from 0.59 part of magnesium, 3.5 parts of methyl iodide and 75 parts by volume of ether. The reaction mixture so obtained is then boiled for a further ½ hour in a reflux apparatus, then cooled, and decomposed with ice and dilute sulfuric acid. After the addition of ether the benzol-ether layer is washed with water, dried and evaporated.

The oily residue is crude 7-methoxy-1-methylene - 2-methyl-1:2:3:4:9:10-hexahydrophenanthrene-2-carboxylic acid methyl ester of the formula

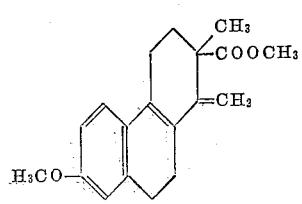

In order to hydrolyse the carbomethoxy group 2.5 parts of the crude product are dissolved in 10 parts by volume of alcohol, and, after the addition of 7.5 parts of potassium hydroxide, heated at about 170° C. in an open vessel until the potassium salt precipitates in solid form. The cooled melt is dissolved in water, and small quantities of a neutral portion are extracted from the alkaline solution by means of ether. The aqueous alkaline layer is then acidified and the acid which is precipitated in crystalline form is purified by recrystallisation from a mixture of acetone and methanol. In this manner there is obtained the 7-methoxy-1-methylene-2-methyl-1:2:3:4:9:10-hexahydrophenanthrene - 2 - carboxylic acid melting 137–138° C. with decomposition.

8. parts of the unsaturated acid melting at 137–138° C. are dissolved in 1000 parts by volume of methanol and hydrogenated in the presence of 8 parts of a platinum catalyst at room temperature. After the quantity of hydrogen calculated as one molecular equivalent has been absorbed the hydrogenation ceases. The catalyst is then removed by filtration, and the methanol solution is evaporated. By fractional crystallisation from acetone and methanol, there is obtained from the residue 7-methoxy-1:2-dimethyl-1:2:3:4:9:10-hexahydrophenanthrene - 2 - carboxylic acid of the formula

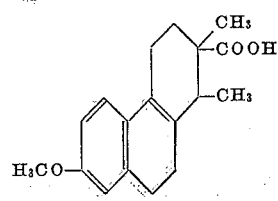

melting at 199–200° C.

Example 6

5.5 parts of 7 - methoxy-1-oxo-2-n-propyl-1:2:3:4:9:10-hexahydrophenanthrene - 2 - carboxylic acid methyl ester melting at 66–67° C. and having the formula

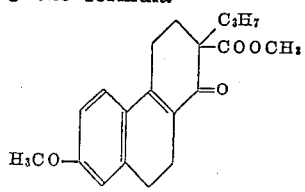

are dissolved in 85 parts by volume of benzene, and run at 0° C. with agitation into a Grignard solution obtained from 0.61 part of magnesium, 3.95 parts of ethyl iodide and 85 parts by volume of ether. The reaction mixture is boiled for ½ hour, cooled with ice, and decomposed with ice and sulfuric acid. The benzene-ether mixture, after being washed with water and dried, leaves behind an oil which consists mainly of crude 7-methoxy-1 - ethylidene - 2 - n-propyl - 1:2:3:4:9:10-hexahydrophenanthrene - 2 - carboxylic acid methyl ester of the formula

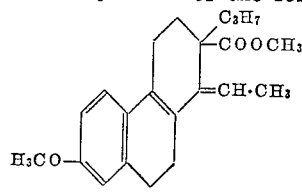

In order to hydrolyse the carbomethoxy group 3 parts of this crude product are heated in a mixture of 9 parts of potassium hydroxide and 20 parts by volume of ethanol at 170–180° C. The reaction product is worked up according to example 1. By fractional crystallisation of the crude acid so obtained from acetone and methanol there are obtained two isomeric 7-methoxy - 1 - ethylidene - n - propyl - 1:2:3:4:9:10-hexahydrophenanthrene - 2 - carboylic acids of the formula

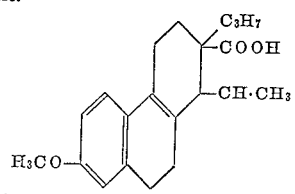

melting with decomposition at 156–158° C. and 149–151° C., respectively.

3.5 parts of a mixture of these two isomeric unsaturated carboxylic acids are dissolved in 800 parts by volume of a 2N-aqueous solution of sodium hydroxide, and hydrogenated in the presence of 5 parts of a nickel catalyst at about 50° C. When the absorption of hydrogen has ceased, the whole is filtered to remove the catalyst and the alkaline solution is acidified. By fractional crystallization from acetone and methanol the crystalline acid so obtained is separated into the two isomeric 7-methoxy-1-ethyl-2-n-propyl-1:2:3:4:9:10- hexahydrophenanthrene-2-carboxylic acids having the formula

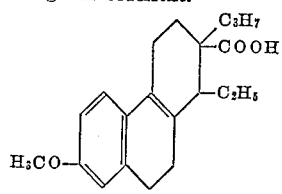

and melting at 218–220° C. and 153–155° C., respectively.

What we claim is:

1. A hexahydrophenanthrene compound of the formula

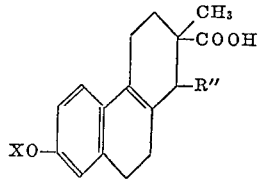

wherein R″ stands for a member selected from the group consisting of ethyl and methyl and X represents a member selected from the group consisting of hydrogen and lower alkyl.

2. The 7-methoxy-1-ethyl-2-methyl-1,2,3,4,9,-10-hexahydrophenanthrene-2-carboxylic acid of the formula

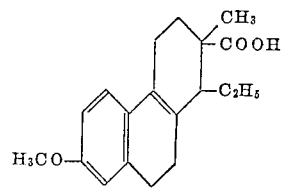

3. The 7-hydroxy-1-ethyl-2-methyl-1,2,3,4,9,-10-hexahydrophenanthrene-2-carboxylic acid of the formula

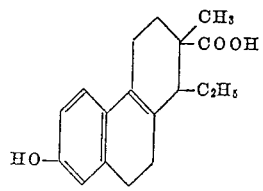

4. The 7- methoxy-1,2- dimethyl-1,2,3,4,9,10-hexahydrophenanthrene-2-carboxylic acid of the formula

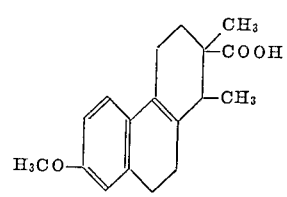

KARL MIESCHER.
JULES HEER.
JEAN-RENÉ BILLETER.
GEORG ANNER.

REFERENCES CITED

The following references are of record in the file of this patent:

UNITED STATES PATENTS

| Number | Name | Date |
|---|---|---|
| 2,429,166 | Miescher et al. | Oct. 14, 1947 |

FOREIGN PATENTS

| Number | Country | Date |
|---|---|---|
| 250,806 | Switzerland | Sept. 15, 1947 |

OTHER REFERENCES

Anner and Heer: Helvetica Chim. Acta, vol. 29, pp. 1889–1895 (1946).

Newman et al.: Jour. Amer. Chem. Soc., vol 62, page 973 (1940).

Bachmann: Jour. Amer. Chem. Soc., vol. 64, pp. 974–981 (1942).

Miescher: Helv. Chim. Acta, vol. 27, pp. 1727–1737 (1944).

Heer et al.: Hel. Chim. Acta, vol. 28, pp. 991–997 (1945)